United States Patent
Asami

(10) Patent No.: US 8,818,596 B2
(45) Date of Patent: Aug. 26, 2014

(54) MOTOR CONTROLLER

(75) Inventor: Takayuki Asami, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 123 days.

(21) Appl. No.: 13/576,103

(22) PCT Filed: Oct. 26, 2011

(86) PCT No.: PCT/JP2011/074731
§ 371 (c)(1),
(2), (4) Date: Jul. 30, 2012

(87) PCT Pub. No.: WO2013/061432
PCT Pub. Date: May 2, 2013

(65) Prior Publication Data
US 2013/0110334 A1 May 2, 2013

(51) Int. Cl.
*B60L 11/18* (2006.01)

(52) U.S. Cl.
CPC .......... *B06L 11/1803* (2013.01); *Y02T 10/7005* (2013.01); *Y02T 10/7038* (2013.01)
USPC ........................................................ 701/22

(58) Field of Classification Search
USPC ........................................................ 701/22
See application file for complete search history.

(56) References Cited

U.S. PATENT DOCUMENTS

| 7,506,182 | B2 * | 3/2009 | Taniguchi et al. | 701/22 |
| 7,576,500 | B2 * | 8/2009 | Patel et al. | 701/22 |
| 2001/0012208 | A1 * | 8/2001 | Boys | 363/23 |
| 2006/0076914 | A1 | 4/2006 | Yaguchi | |
| 2009/0198399 | A1 * | 8/2009 | Kubo et al. | 701/22 |
| 2009/0237019 | A1 | 9/2009 | Yamakawa | |
| 2010/0220501 | A1 * | 9/2010 | Krause | 363/17 |
| 2010/0228416 | A1 * | 9/2010 | Sugiyama | 701/22 |
| 2010/0244558 | A1 | 9/2010 | Mitsutani | |
| 2010/0270955 | A1 | 10/2010 | Yamakawa | |
| 2011/0193509 | A1 * | 8/2011 | Ooyama et al. | 318/503 |

FOREIGN PATENT DOCUMENTS

| JP | 2006-136184 A | 5/2006 |
| JP | 2008-072868 A | 3/2008 |
| JP | 2008-312306 A | 12/2008 |

(Continued)

OTHER PUBLICATIONS

International Search Report mailed Nov. 22, 2011 & Written Opinion of PCT/JP2011/074731.

*Primary Examiner* — Helal A Algahaim
*Assistant Examiner* — Dale W Hilgendorf
(74) *Attorney, Agent, or Firm* — Kenyon & Kenyon LLP

(57) ABSTRACT

Provided is a technology capable of ensuring drivability of an electric vehicle while preventing thermal destruction of its parts and deterioration of a battery, caused by an LC resonance. The present specification discloses a motor controller for an electric vehicle having a battery, a converter circuit, an inverter circuit, a smoothing capacitor, and a motor, the motor controller configured to control a drive of the motor by controlling an operation of the inverter circuit. In this motor controller, an operating region of the motor that causes a resonance of an LC circuit configured by a reactor of the converter circuit and the smoothing capacitor is set as a resonance region. In this motor controller, execution of square-wave control on the motor is permitted only over a predetermined time period, when the converter circuit is not boosting the DC power and an operating point of the motor is included in the resonance region.

3 Claims, 3 Drawing Sheets

(56) References Cited

FOREIGN PATENT DOCUMENTS

| | | | |
|---|---|---|---|
| JP | 2009-148139 A | 7/2009 |
| JP | 2009-201192 A | 9/2009 |
| JP | 2009-225633 A | 10/2009 |
| JP | 2010-213404 A | 9/2010 |

* cited by examiner

MOTOR CONTROLLER

This is a 371 national phase application of PCT/JP2011/074731 filed 26 Oct. 2011, the contents of which are incorporated herein by reference.

TECHNICAL FIELD

The present specification relates to a motor controller.

BACKGROUND ART

Electric vehicles in which power of batteries thereof is boosted by converter circuits and supplied to motors have been known. These types of electric vehicles each have an LC circuit configured by a smoothing capacitor that smoothens a voltage increased by the converter circuit and a reactor of the converter circuit. A resonance of the LC circuit (LC resonance) causes a current flowing therethrough to oscillate with a large amplitude and at a high frequency, overheating parts of the electric vehicle and deteriorating the battery. For this reason, the occurrence of an LC resonance needs to be prevented as much as possible in order for the electric vehicle to operate.

In many electric vehicles, sine-wave PWM control system and square-wave control system are used in combination as a motor control system. The sine-wave PWM control system is used when a motor of an electric vehicle operates in a low-speed/low-torque region. The square-wave control system is used when the motor operates in a high-speed/high-torque region. The sine-wave PWM control system does not cause the LC resonance because an inverter circuit is switched on a cycle based on a carrier frequency higher than a resonance frequency of the LC circuit in this system. The square-wave control system, on the other hand, causes the LC resonance, depending on a rotational speed of the motor, because the inverter circuit is switched on an interruption cycle based on the rotational speed of the motor.

Patent document 1 discloses a technology for avoiding an LC resonance when the square-wave control system described above is used. According to patent document 1, when an operating point of a motor is included in a predetermined resonance region, a voltage of an inverter circuit is increased to be higher than a voltage of a battery by a converter circuit, and the inverter circuit is controlled using sine-wave PWM control system. The resonance region here means an operating region of the motor where an LC circuit might resonate when the motor operates at its torque and rotational speed. The technology disclosed in patent document 1 boosts the voltage at the converter circuit to expand a region to which the sine-wave PWM control system can be applied. Therefore, the square-wave control system is not used in the resonance region to which the sine-wave PWM control system is applied. The technology disclosed in patent document 1 is capable of preventing the occurrence of the LC resonance because the square-wave control system is not used when the resonance region includes the operating point of the motor.

CITATION LIST

Patent Literature

Patent Document 1: Japanese Patent Application Publication No. 2009-225633

SUMMARY OF INVENTION

An electric vehicle sometimes must operate in some circumstances where its inverter circuit needs to be thermally protected or where its converter circuit breaks down and thus cannot boost a voltage. In such a circumstance where voltage boosting is not possible, the region to which the sine-wave PWM control system can be applied becomes narrow, and the resonance region falls outside the region to which the sine-wave PWM control system can be applied. In this case, completely prohibiting the execution of the square-wave control system in the resonance region disables the output of a desired torque to the motor, degrading the drivability of the electric vehicle. Expected is a technology that is capable of ensuring drivability of an electric vehicle while preventing overheating of its parts and deterioration of its battery caused by the LC resonance.

The present specification discloses a motor controller for an electric vehicle including a battery, a converter circuit that boosts a DC power obtained from the battery, an inverter circuit that converts the DC power obtained from the converter circuit into an AC power, a smoothing capacitor provided between the converter circuit and the inverter circuit, and a motor driven by the AC power obtained from the inverter circuit. The motor controller is configured to control a drive of the motor by controlling an operation of the inverter circuit. In this motor controller, an operating region of the motor that causes a resonance of an LC circuit configured by a reactor of the converter circuit and the smoothing capacitor is set as a resonance region. This motor controller permits execution of square-wave control on the motor only over a predetermined time period in a case where the converter circuit is not boosting the DC power and an operating point of the motor is included in the resonance region.

According to the motor controller described above, the square-wave control of the motor is permitted in the resonance region over the predetermined time period, so that a torque output by the motor is prevented from dropping and that drivability of the electric vehicle is ensured. In this case, although an LC resonance occurs as a result of the execution of the square-wave control on the motor, the execution of the square-wave control is prohibited after a lapse of the predetermined time period. Therefore, the LC resonance can be terminated before parts of the electric vehicle overheat or the battery deteriorates. This motor controller is capable of ensuring drivability of the electric vehicle while preventing overheating of the parts and deterioration of the battery caused by the LC resonance.

It is preferred that, in the case where the converter circuit is not boosting the DC power and the operating point of the motor is included in the resonance region, the motor controller described above permits the execution of the square-wave control of the motor until a voltage of the battery falls below a lower limit value, and prohibits the execution of the square-wave control on the motor once the voltage of the battery falls below the lower limit value.

When the LC resonance occurs, the battery repeatedly outputs a large current, which gradually lowers the voltage of the battery. The motor controller described above, however, permits the execution of the square-wave control of the motor while the voltage of the battery is higher than the lower limit value, and prohibits the execution of the square-wave control of the motor when the voltage of the battery lowers and falls below the lower limit value as a result of the continuous LC resonance. The motor controller described above is capable of ensuring the drivability of the electric vehicle while preventing the thermal destruction of the parts and the deterioration of the battery caused by the LC resonance.

The present specification discloses another motor controller. This motor controller is for an electric vehicle that includes a battery, a converter circuit that boosts a DC power obtained from the battery, an inverter circuit that converts the DC power obtained from the converter circuit into an AC power, a smoothing capacitor provided between the converter circuit and the inverter circuit, and a motor driven by the AC power obtained from the inverter circuit. The motor controller is configured to control a drive of the motor by controlling an operation of the inverter circuit. In this motor controller, an operating region of the motor that causes a resonance of an LC circuit configured by a reactor of the converter circuit and the smoothing capacitor is set as a resonance region. In this motor controller, in a case where the converter circuit is not boosting the DC power and an operating point of the motor is included in the resonance region, execution of square-wave control on the motor is permitted until a voltage of the battery falls below a lower limit value, and prohibited once the voltage of the battery falls below the lower limit value.

The motor controller described above is capable of ensuring the drivability of the electric vehicle while preventing the thermal destruction of its parts and the deterioration of the battery caused by the LC resonance.

The technology disclosed by the present specification is described in detail using the following embodiments of the present invention.

DESCRIPTION OF EMBODIMENTS

Figure 1:
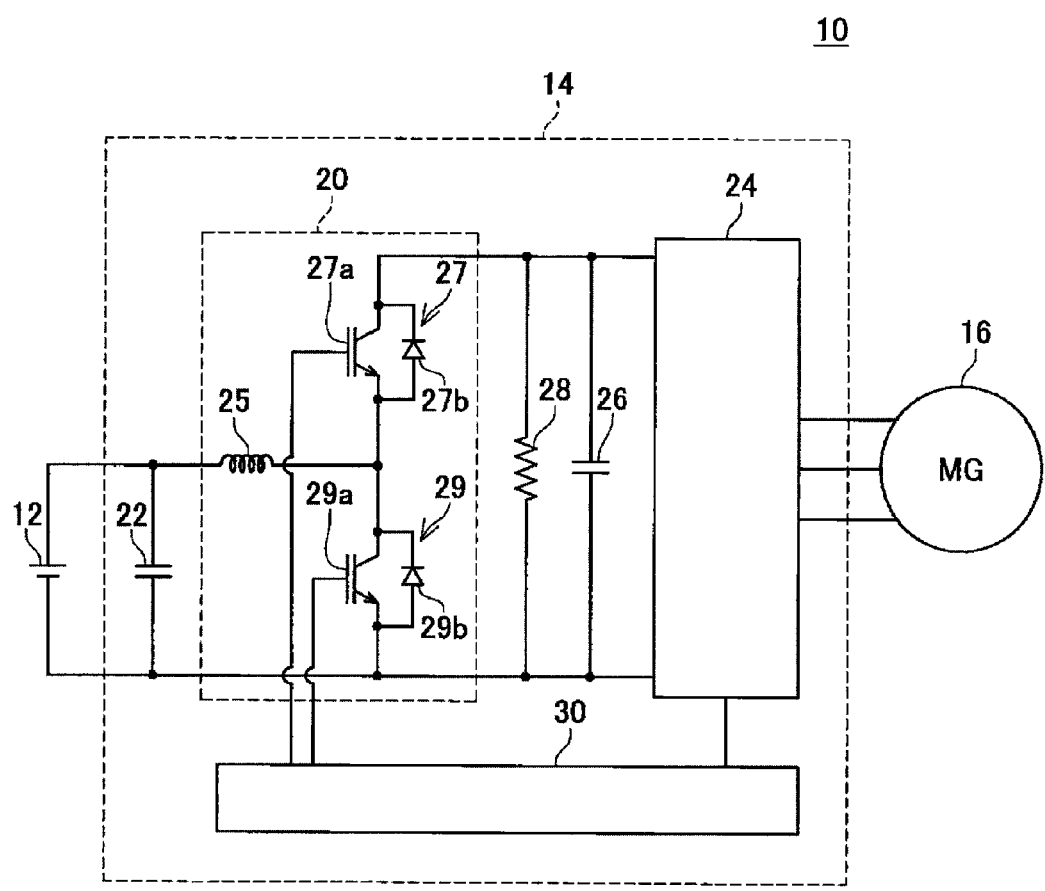
FIG. 1 is a diagram schematically showing an electrical system of an electric vehicle 10.

FIG. 1 shows an electrical system of an electric vehicle 10. The electric vehicle 10 has a battery 12, a power conversion device 14, and a motor 16. In the electric vehicle 10, power accumulated in the battery 12 is supplied to the motor 16 via the power conversion device 14. When the battery 12 is a secondary battery, power regenerated by the motor 16 can be supplied to the battery 12 via the power conversion device 14 to charge the battery 12 at the time of deceleration of the electric vehicle 10. The electric vehicle 10 may be a battery electric vehicle or a hybrid vehicle. The battery 12 may be a secondary battery such as a nickel hydride battery or a lithium-ion battery, or a primary battery such as a fuel cell. The motor 16 is a three-phase AC motor that rotates drive shafts of wheels.

The power conversion device 14 has a converter circuit 20, a first smoothing capacitor 22, a three-phase inverter circuit 24, a second smoothing capacitor 26, a discharge resistance 28, and a controller 30.

The converter circuit 20 is a DC/DC converter that boosts a voltage supplied from the battery 12 to a voltage suitable for driving the motor 16 according to need. In the present embodiment, the voltage supplied from the battery 12 is 300 V, and the voltage suitable for driving the motor 16 is 600 V. The converter circuit 20 also can reduce a voltage that is regenerated by the motor 16 at the time of deceleration of the electric vehicle 10 to a voltage equivalent to the voltage of the battery 12. The converter circuit 20 has a reactor 25, an upper arm switch 27, and a lower arm switch 29. The upper arm switch 27 is a reverse conduction switch that has an IGBT 27, which is a switching element, and a reflux diode 27b. The lower arm switch 29 is a reverse conduction switch that has an IGBT 29a, which is a switching element, and a reflux diode 29b. The upper arm switch 27 and the lower arm switch 29 are switched on/off in a complementary manner.

The first smoothing capacitor 22 is provided between the battery 12 and the converter circuit 20 and smoothens a voltage that is input/output between the battery 12 and the converter circuit 20.

The three-phase inverter circuit 24 converts a DC power supplied from the converter circuit 20 into a three-phase AC power used to drive the motor 16. The three-phase inverter circuit 24 can also convert a three-phase AC power that is regenerated by the motor 16 at the time of deceleration of the electric vehicle 10 into a DC power supplied to the converter circuit 20. Switching operations by the three-phase inverter circuit 24 are controlled by the controller 30.

The second smoothing capacitor 26 is provided between the converter circuit 20 and the three-phase inverter circuit 24 and smoothens a voltage that is input/output between the converter circuit 20 and the three-phase inverter circuit 24.

The discharge resistance 28 is parallely connected to the second smoothing capacitor 26. The discharge resistance 28 is provided to discharge electric charge accumulated in the second smoothing capacitor 26, when the electrical system of the electric vehicle 10 stops and the converter circuit 20 and the three-phase inverter circuit 24 no longer operate.

The controller 30 controls on/off operations of the upper arm switch 27 and the lower arm switch 29 of the converter circuit 20. The controller 30 also controls on/off operations of switching elements of the three-phase inverter circuit 24. Although not shown, the battery 12 is provided with a voltage sensor for detecting a voltage. A detection value obtained from the voltage sensor is input to the controller 30.

The power is supplied from the battery 12 to the motor 16 to operate the motor 16 with power. In this case, the converter circuit 20 converts low-voltage DC power that is input from the battery 12 into high-voltage DC power that is output to the three-phase inverter circuit 24. In so doing, the converter circuit 20 functions as a voltage boosting chopper circuit using the reactor 25, the switching element 29a of the lower arm switch 29, and the reflux diode 27b of the upper arm switch 27. A ratio between the high-side voltage VH and the low-side voltage VL here depends on a duty ratio between ON state and OFF state of the lower arm switch 29. Appropriately setting the duty ratio of the lower arm switch 29 can realize the target high-side voltage VH.

The power is supplied from the motor 16 to the battery 12 to allow the motor 16 to perform regenerative operation. In this case, the converter circuit 20 converts the high-voltage DC power that is input from the three-phase inverter circuit 24 into the low-voltage DC power that is output to the battery 12. In so doing, the converter circuit 20 function as a step-down chopper circuit using the reactor 25, the switching element 27a of the upper arm switch 27, and the reflux diode 29b of the lower arm switch 29. A ratio between the high-side voltage VH and the low-side voltage VL here depends on a duty ratio between ON state and OFF state of the upper arm switch 27. Appropriately setting the duty ratio of the upper arm switch 27 can realize the target high-side voltage VH.

In the case of operating the three-phase inverter circuit 24 in a thermal protection mode such as upon a failure in a cooling system of the three-phase inverter circuit 24, the converter circuit 20 might not boost or reduce the voltage. In this case, the upper arm switch 27 stays ON to cause the voltage on the battery 12 side be equal to the voltage on the three-phase inverter circuit 24 side. In the case of an ON failure of the upper arm switch 27 and OFF failure of the lower arm switch 29 as well, the converter circuit 20 does not boost or reduce the voltage, and the voltage on the battery 12 side and the voltage on the three-phase inverter circuit 24 side are caused to be equal to each other.

The control system of the motor 16 is switched according to the rotational speed and torque thereof in order to expand a rotary speed region in which the motor 16 can operate. In a low-seed/low-torque region, the motor 16 is driven based on sine-wave PWM control. In the sine-wave PWM control, the operation of the three-phase inverter circuit 24 is controlled in a manner that a sine-wave voltage is practically applied from the three-phase inverter circuit 24 to the motor 16. The execution of the sine-wave PWM control can drive the motor 16 with a high degree of efficiency while preventing torque ripple. On the other hand, in a high-speed/high-torque region, the motor 16 is driven based on square-wave control. In the square-wave control, the operation of the three-phase inverter circuit 24 is controlled in a manner that a square-wave voltage is applied from the three-phase inverter circuit 24 to the motor 16. In the high-speed/high-torque region, whereas the sine-wave PWM control cannot stably control the motor 16 due to a high counter-electromotive force of the motor 16, the square-wave control can stably control the motor 16. As a result, the rotary speed region in which the motor 16 can operate can be expanded.

In the power conversion device 14, an LC circuit is configured by the reactor 25 of the converter circuit 20 and the second smoothing capacitor 26. When the LC circuit resonates (LC resonance), current flowing through the power conversion device 14 oscillates with a large amplitude and at a high frequency. In this case, the large current that repeatedly flows therein might overheat the reactor 25 and other parts of the power conversion device 14 and the battery 12. Moreover, repeatedly extracting the large current from the battery 12 accelerates the deterioration of the battery 12.

When the LC resonance occurs, the current oscillates with a cycle shorter than a data acquisition cycle of a current sensor mounted in the electric vehicle 10, and consequently, a current at a level that cannot be measured by the current sensor flows. For this reason, the current that actually flows through the power conversion device 14 cannot be estimated accurately. In the present embodiment, therefore, an operating region of the motor 16 that is likely to cause the LC resonance is set beforehand as the resonance region.

Figure 2:
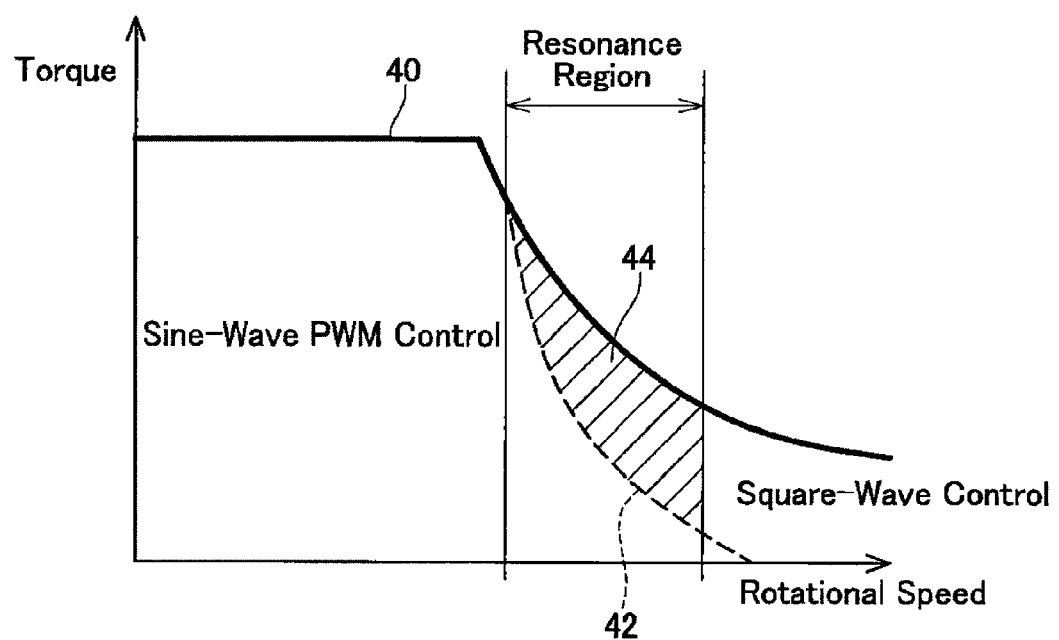
FIG. 2 is a diagram showing the operating characteristics of a motor 16, which are obtained when voltage boosting is not performed by a converter circuit 20.

FIG. 2 shows the operating characteristics of the motor 16 with respect to its torque and rotational speed, the operating characteristics being obtained when voltage boosting/reducing is not performed by the converter circuit 20. The solid line 40 in FIG. 2 indicates a borderline of the operable range of the motor 16. The dashed line 42 in FIG. 2 indicates a borderline where the drive system of the motor 16 is switched between the sine-wave PWM control system and the square-wave control system. When an operating point of the motor 16 is located on the left side of the dashed line 42, the controller 30 drives the motor 16 based on the sine-wave PWM control. When the operating point of the motor 16 is located on the right side of the dashed line 42, the controller 30 drives the motor 16 based on the square-wave control. When the converter circuit 20 boosts or reduces the voltage, the position of the dashed line 42 changes according to the voltage boosted by the converter circuit 20. When the voltage boosted by the converter circuit 20 is high, the sine-wave PWM control can be performed even at high rotational speeds, increasing the rotational speed at which the drive system is switched from the sine-wave PWM control system to the square-wave control system.

Driving the motor 16 based on the sine-wave PWM control causes extremely small torque ripple. The cycle of the switching operations by the three-phase inverter circuit 24 corresponds to the carrier frequency. The carrier frequency that is used in the sine-wave PWM control is normally higher than the resonance frequency of the LC circuit configured inside the power conversion device 14. Since the difference between the carrier frequency and the resonance frequency is large, the LC resonance does not occur as long as the sine-wave PWM control is performed.

However, driving the motor 16 based on the square-wave control causes somewhat great torque ripple. The cycle of the switching operations by the three-phase inverter circuit 24 complies with an interruption cycle based on the rotational speed of the motor 16. Thus, depending on the rotational speed of the motor 16, the switching cycle of the three-phase inverter circuit 24 becomes close to the resonance cycle of the LC circuit, causing the LC resonance.

When the converter circuit 20 boosts the voltage, the region to which the sine-wave PWM control can be applied is expanded, and the sine-wave PWM control can be applied even to the resonance region. In this case, the square-wave control no longer needs to be performed in the resonance region, preventing the occurrence of the LC resonance. However, when the converter circuit 20 breaks down or cannot boost the voltage or when the electric vehicle 10 is operated in a mode in which the voltage is not boosted, the voltage is not boosted by the converter circuit 20. In such a case, the range to which the sine-wave PWM control can be applied becomes so narrow that the square-wave control is inevitably performed in the resonance region. When the execution of the square-wave control in the resonance region is completely prohibited in such a case, the occurrence of the LC resonance can be prevented, but the torque output by the motor 16 decreases significantly.

Therefore, in the electric vehicle 10 of the present embodiment, the execution of the square-wave control is permitted only for a predetermined time period, when the converter circuit 20 does not boost the voltage and the operating point of the motor 16 is included in the resonance region. The predetermined time period is determined from durations of the parts of the power conversion device 14 when the largest current continuously flows upon the occurrence of the LC resonance. In the present embodiment, the duration of the reactor 25, the most heat-sensitive among all parts of the power conversion device 14, is used as the predetermined time period. A decrease in torque of the motor 16 can be prevented as much as possible by permitting the execution of the square-wave control in the resonance region only over a short period of time.

More specifically, in the electric vehicle 10 of the present embodiment, when the motor 16 operates in a region 44 shown by the diagonal lines in FIG. 2, the execution of the square-wave control is permitted until the predetermined time period elapses and then prohibited after a lapse of the predetermined time period. In this manner, a decrease in the torque output by the motor 16 can be prevented as much as possible.

In addition, in the electric vehicle 10 of the present embodiment, the voltage of the battery 12 is monitored. The execution of the square-wave control is permitted until the voltage of the battery 12 falls below a lower limit value and then prohibited when the voltage of the battery 12 actually falls below the lower limit value. Because the large current is repeatedly extracted from the battery 12 if the LC resonance continues to occur, the voltage of the battery 12 drops gradually. In the present embodiment, therefore, the execution of the square-wave control is prohibited when the voltage of the battery 12 falls below the lower limit value, so that the LC resonance no longer continues. The deterioration of the battery 12 caused by the LC resonance can be prevented in the manner described above.

Figure 3:
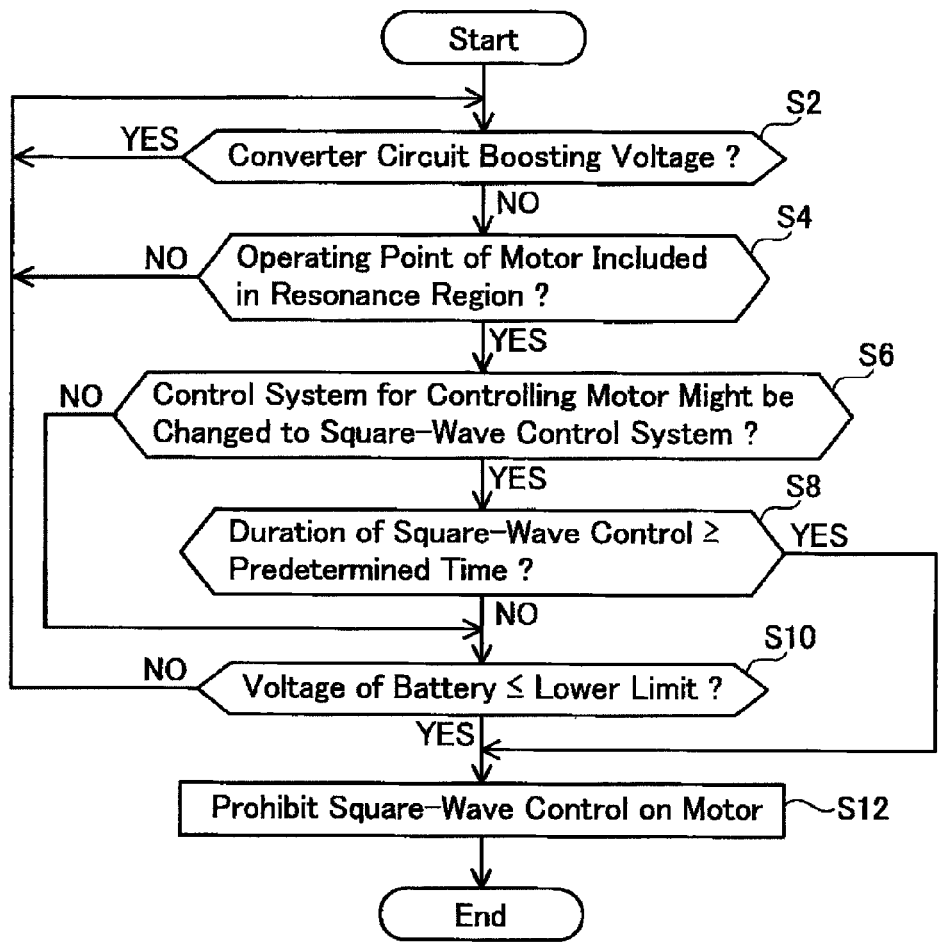
FIG. 3 is a flowchart of processes performed by a controller 30.

Processes performed by the controller 30 are described hereinafter with reference to FIG. 3.

In step S2, the controller 30 determines whether the converter circuit 20 is boosting the voltage or not. When the converter circuit 20 is boosting the voltage (YES), it means that the LC resonance will not occur, so the process returns to step S2. When the converter circuit 20 is not boosting the voltage (NO), the process proceeds to step S4.

In step S4, the controller 30 determines whether the operating point of the motor 16 is included in the resonance region or not. In the present embodiment, it is determined that the operating point of the motor 16 is included in the resonance region if the rotational speed of the motor 16 falls within a predetermined range. If the operating point of the motor 16 is not included in the resonance region (NO), the LC resonance will not occur, so the process returns to step S2. If the operating point of the motor 16 is included in the resonance region (YES), the process proceeds to step S6.

In step S6, the controller 30 determines whether or not there is a possibility that the control system for controlling the motor 16 is changed to the square-wave control system. The controller 30 of the present embodiment uses a previously-stored map and determines the control system of the motor 16 from the rotational speed and torque of the motor 16. The map used in this step is for switching the control system between the sine-wave PWM control system and the square-wave control system when the voltage of the power conversion device 14 is an assumed lower limit voltage. When the control system of the motor 16 is not the square-wave control system (NO), the LC resonance might not occur. Therefore, the process proceeds to step S10. When the control system of the motor 16 is the square-wave control system (YES), the process proceeds to step S8.

In step S8, the controller 30 determines whether or not a duration of the square-wave control performed on the motor 16 in the resonance region reaches the predetermined time period. When the duration of the square-wave control does not reach the predetermined time period (NO), the process proceeds to step S10. When the duration of the square-wave control reaches the predetermined time period (YES), the process proceeds to step S12, where the execution of the square-wave control of the motor 16 is prohibited.

In step S10, the controller 30 determines whether the voltage of the battery 12 is equal to or lower than the lower limit value. When the voltage of the battery 12 exceeds the lower limit value (NO), the process returns to step S2. When the voltage of the battery 12 is equal to or lower than the lower limit value (YES), the process proceeds to step S12, where the execution of the square-wave control on the motor 16 is prohibited.

According to the present embodiment, a decrease in torque of the motor 16 can be prevented and drivability of the electric vehicle 10 can be ensured, by permitting the execution of the square-wave control on the motor 16 in the resonance region only for the predetermined time period. In this case, although the LC resonance occurs as a result of the square-wave control performed on the motor 16, prohibiting the execution of the square-wave control after a lapse of the predetermined time period can terminate the LC resonance before the parts of the power conversion device 14 are overheated or the battery 12 deteriorates. The present embodiment can ensure drivability of the electric vehicle 10 while preventing overheating of the parts and deterioration of the battery 12 caused by the LC resonance.

The above has described a configuration in which the execution of the square-wave control on the motor 16 in the resonance region is prohibited when the duration of the square-wave control reaches the predetermined time period or the voltage of the battery becomes equal to or lower than the lower limit value as a result of monitoring both the duration of the square-wave control and the voltage of the battery in the case where the converter circuit 20 does not boost the voltage and the operating point of the motor 16 is included in the resonance region. Unlike this configuration, only the duration of the square-wave control or the voltage of the battery may be monitored. In other words, in the flowchart shown in FIG. 3, step S10 may be omitted, and the execution of the square-wave control may be prohibited when it is determined, as a result of monitoring only the duration of the square-wave control, that the duration of the square-wave control reaches the predetermined time period. Alternatively, in the flowchart shown in FIG. 3, steps S6 and S8 may be omitted, and the execution of the square-wave control may be prohibited when it is determined, as a result of monitoring only the voltage of the battery 12, that the voltage of the battery 12 becomes equal to or lower than the lower limit value.

Representative and non-limiting specific examples of the present invention are described above in detail with reference to the drawings. The detailed descriptions merely intend to show those skilled in the art the details for implementing the preferred examples of the present invention, and not to limit the scope of the present invention. Additional characteristics and inventions disclosed herein can be used independently of or along with, other characteristics or inventions in order to provide a further improved motor controller.

The combinations of the characteristics and steps disclosed in the detailed description of the invention above are not essential for implementation of the present invention in the broadest sense, and are merely to describe the representative specific examples of the present invention. Moreover, combinations of various characteristics of the abovementioned representative specific examples and various characteristics described in the independent and dependent claims do not necessarily comply with the specific examples described herein or the provided order, when providing an additional and effective embodiment of the present invention.

All of the characteristics described in the present specification and/or claims intend to be illustrated, individually and independently from each other, as the limitations of the specific items disclosed and claimed upon filing of the application, separately from the configurations of the characteristics described in the embodiments and/or the claims. Furthermore, all descriptions related to the ranges of values and to the groups are provided herein, with the intention of disclosing the intermediate configurations thereof as the limitations of the specific items disclosed and claimed upon filing of the application.

The above has described in detail the specific examples of the present invention; however, these are merely illustrative and do not limit the scope of the claims. The technologies described in the claims include various changes and modifications of the specific examples illustrated above. The technical elements illustrated in the present specification or drawings demonstrate the technical utility independently or in various combinations, and should not be limited to the combinations described in the claims at the time the application was filed. In addition, the technologies illustrated in the present specification or drawings can achieve a plurality of objects simultaneously and provide the technical utility by simply achieving one of these objects.

The invention claimed is:

1. A motor controller for an electric vehicle including a battery, a converter circuit that boosts a DC power obtained from the battery, an inverter circuit that converts the DC power obtained from the converter circuit into an AC power, a smoothing capacitor provided between the converter circuit and the inverter circuit, and a motor driven by the AC power obtained from the inverter circuit, the motor controller configured to control a drive of the motor by controlling an operation of the inverter circuit,
   wherein a resonance region is an operating region of the motor that causes a resonance of an LC circuit configured by a reactor of the converter circuit and the smoothing capacitor, and
   wherein the motor controller is programmed to permit execution of square-wave control of the motor only within a predetermined time period in a case where the converter circuit is not boosting the DC power and an operating point of the motor is included in the resonance region and the motor controller is programmed to prohibit execution of square-wave control of the motor when outside of the predetermined time period in the case where the converter circuit is not boosting the DC power and the operating point of the motor is included in the resonance region,
   wherein the predetermined time period is shorter than an amount of time needed to overheat the converter circuit or to deteriorate the battery by the resonance of the LC circuit.

2. The motor controller according to claim 1, wherein, in the case where the converter circuit is not boosting the DC power and the operating point of the motor is included in the resonance region, the motor controller permits the execution of the square-wave control of the motor while a voltage of the battery is higher than a lower limit value, and prohibits the execution of the square-wave control of the motor once the voltage of the battery falls below the lower limit value.

3. A motor controller for an electric vehicle including a battery, a converter circuit that boosts a DC power obtained from the battery, an inverter circuit that converts the DC power obtained from the converter circuit into an AC power, a smoothing capacitor provided between the converter circuit and the inverter circuit, and a motor driven by the AC power obtained from the inverter circuit, the motor controller configured to control a drive of the motor by controlling an operation of the inverter circuit,
   wherein a resonance region is an operating region of the motor that causes a resonance of an LC circuit configured by a reactor of the converter circuit and the smoothing capacitor, and
   wherein, in a case where the converter circuit is not boosting the DC power and an operating point of the motor is included in the resonance region, the motor controller is programmed to permit execution of square-wave control of the motor while a voltage of the battery is higher than a lower limit value, and to prohibit the execution of the square-wave control on the motor once the voltage of the battery falls below the lower limit value.

* * * * *